United States Patent
O'Rear

[15] 3,674,312
[45] July 4, 1972

[54] DOUBLE BOX DUMP TRAILER

[72] Inventor: Cecil N. O'Rear, 1118 Claiborne Ave., Minden, La. 71055

[22] Filed: July 17, 1970

[21] Appl. No.: 55,648

[52] U.S. Cl. ................................................... 298/8 T
[51] Int. Cl. ............................................... B60p 1/16
[58] Field of Search .................... 298/8 T, 8 R, 8 H, 22 P; 105/261, 261 A, 263

[56] References Cited

UNITED STATES PATENTS

| | | | |
|---|---|---|---|
| 2,490,532 | 12/1949 | Maxon, Jr. | 298/22 P |
| 2,770,490 | 11/1956 | Hockensmith, Jr. | 298/8 |
| 3,120,408 | 2/1964 | Peuss | 298/8 T |
| 3,152,837 | 10/1964 | Margala | 298/8 |
| 3,361,477 | 1/1968 | Pitts | 298/8 |
| 3,378,302 | 4/1968 | Doeglas et al. | 298/8 |

*Primary Examiner*—A. Harry Levy
*Attorney*—Berman, Davidson and Berman

[57] ABSTRACT

A double box dump trailer in which a relatively long rear box is mounted on the trailer for dumping with a hydraulic mechanism. A somewhat smaller forward box is mounted on the trailer for dumping into the rear box with a hydraulic mechanism. The forward box is provided with an upwardly sloping dumping chute which overlies the rear box when the front box is raised to its fullest extent.

6 Claims, 5 Drawing Figures

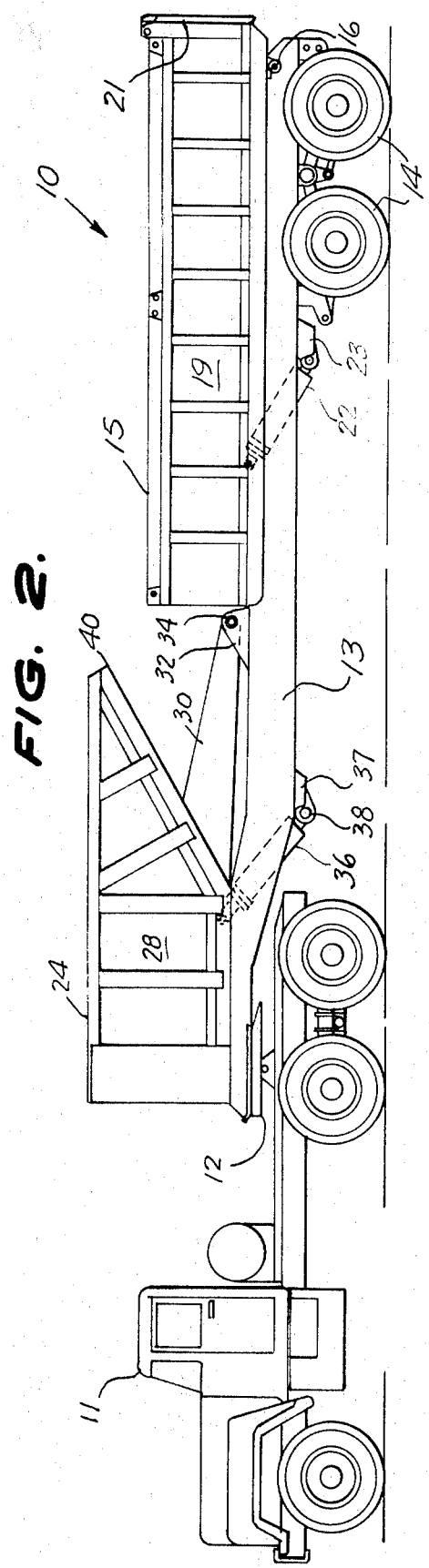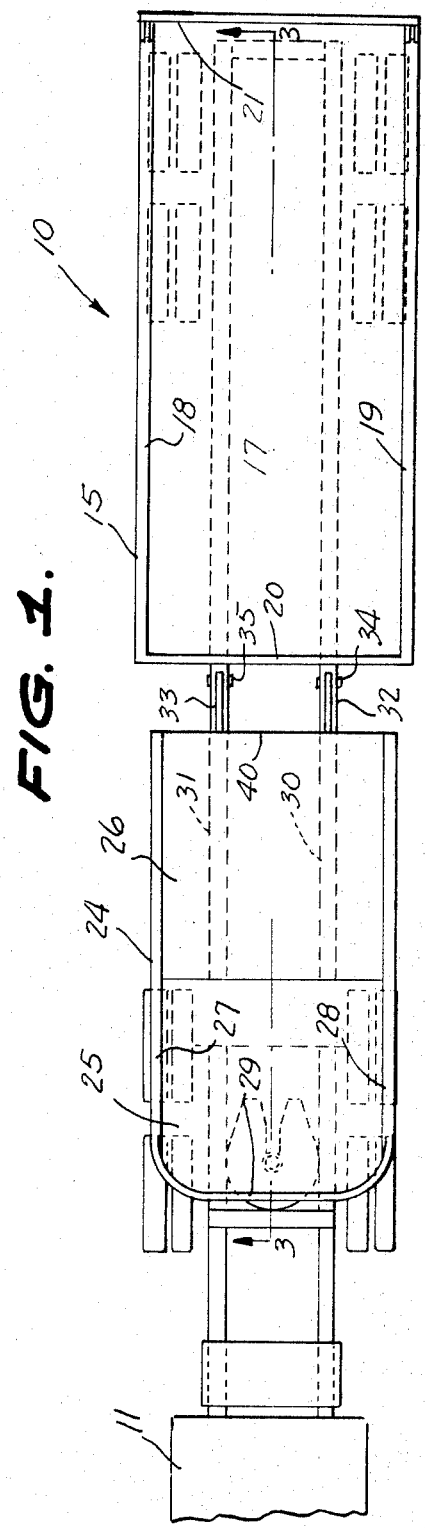

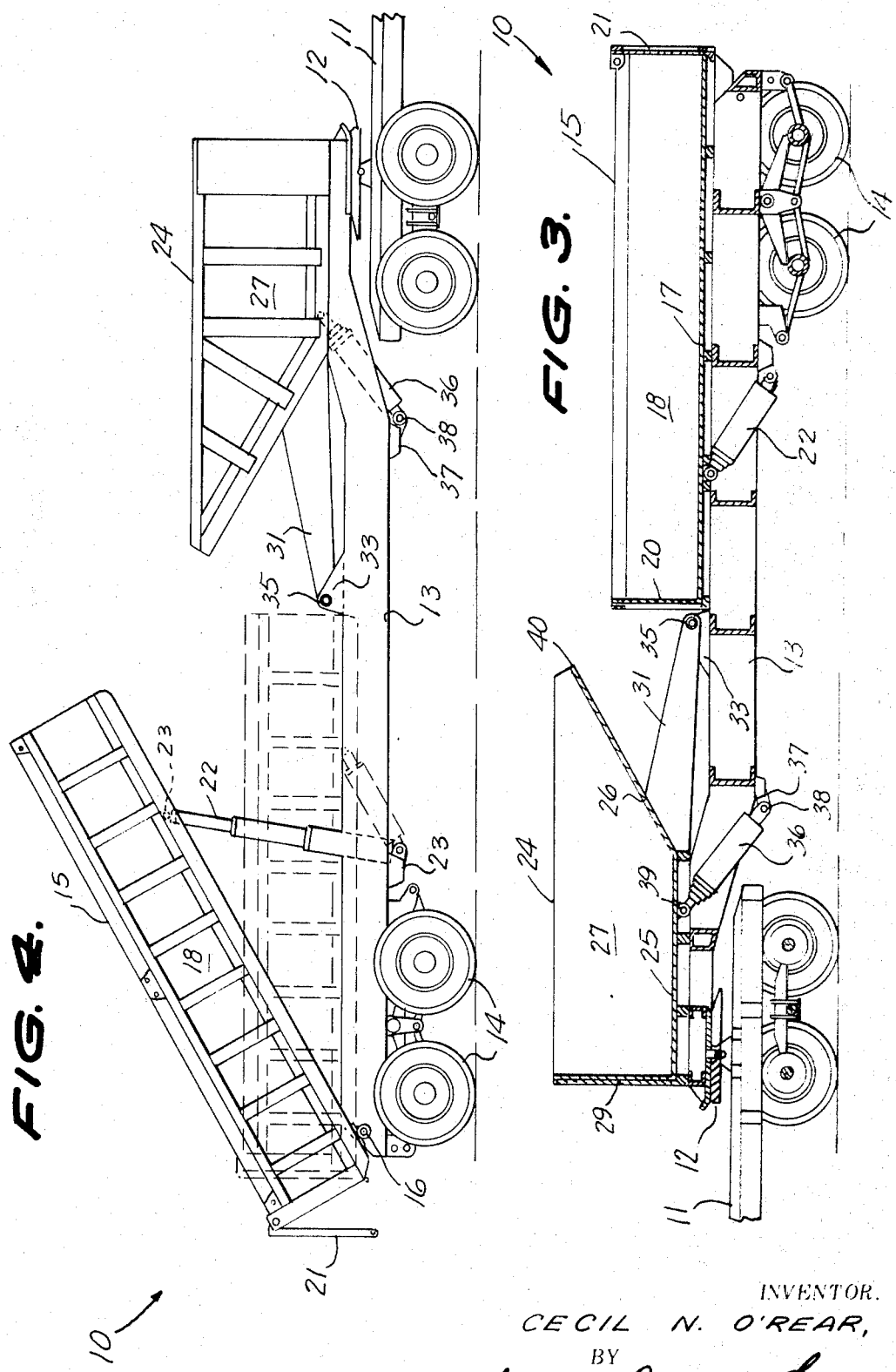

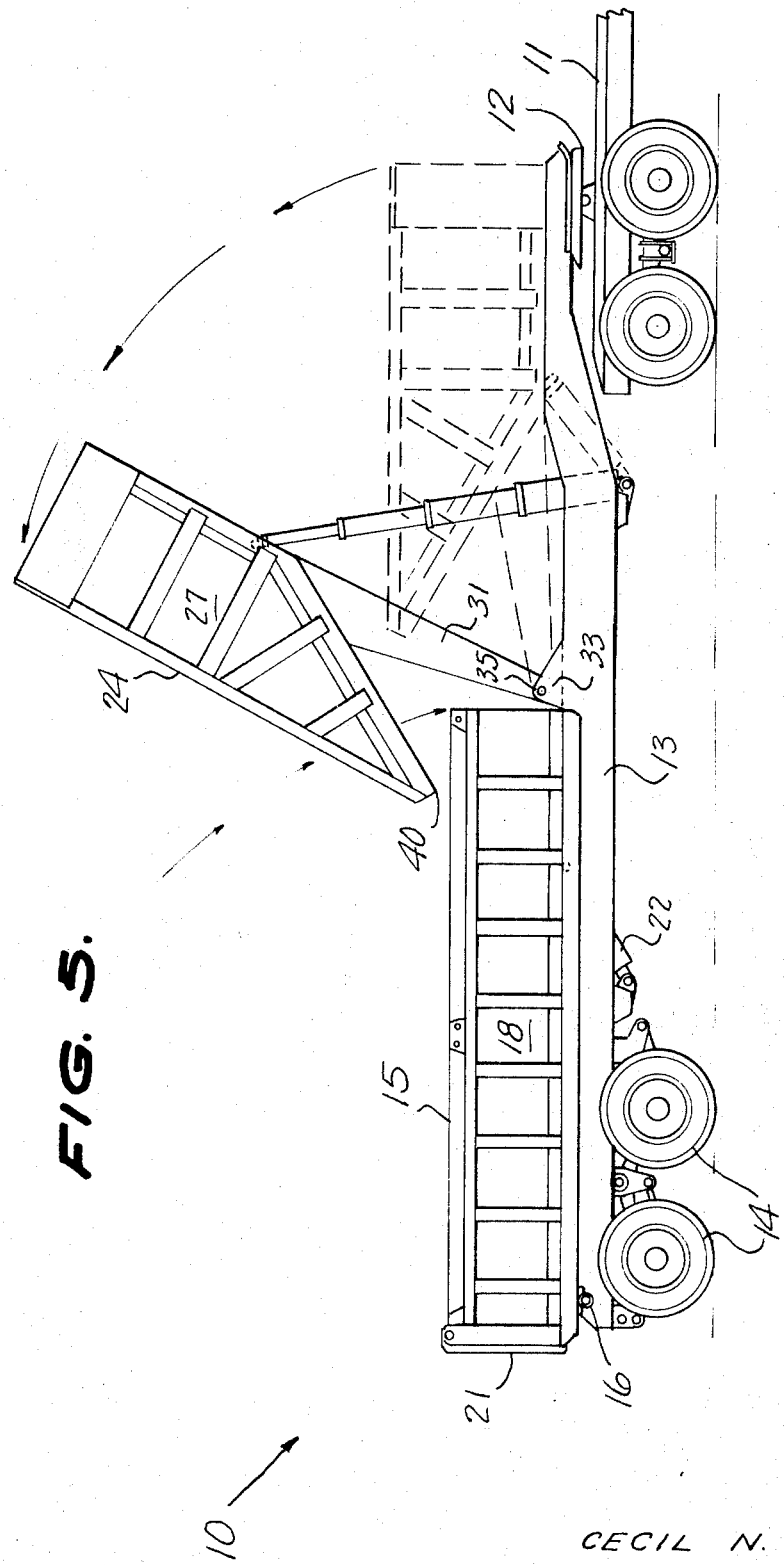

DOUBLE BOX DUMP TRAILER

BACKGROUND OF THE INVENTION

FIELD OF THE INVENTION

The present invention relates to dumping trailers of the type designed for carrying the maximum legal loads.

SUMMARY OF THE INVENTION

The present invention is directed to a dumping trailer of the type designed for carrying the maximum legal loads in which a pair of boxes are mounted on the trailer for dumping with a hydraulic mechanism. The forward box is mounted for a high lift to permit the load to be dumped into the rear box from which it is then dumped onto the ground.

The primary object of the invention is to provide a dumping trailer which is stable during dumping, which can carry to separate materials which do not mix during transit, and which can carry loads to two different locations.

Other objects and advantages will become apparent in the following specification when considered in the light of the attached drawings.

BRIEF DESCRIPTION OF THE DRAWINGS

FIG. 1 is a top plan view of the invention;
FIG. 2 is a side elevation of the invention;
FIG. 3 is a longitudinal sectional view taken along the line 3—3 of FIG. 1, looking in the direction of the arrows;
FIG. 4 is a side elevation of the invention showing the rear box in dumping position; and
FIG. 5 is a side elevation of the invention illustrating the forward box in dumping position.

DESCRIPTION OF THE PREFERRED EMBODIMENT

Referring now to the drawings in detail wherein like reference characters indicate like parts throughout the several figures the reference numeral 10 indicates generally a dumping trailer constructed in accordance with the invention.

The dumping tailer 10 is adapted for use with a heavy duty tractor truck 11 of conventional construction. The truck 11 has a conventional trailer support 12 mounted thereon.

The dumping trailer 10 includes an elongate generally horizontal frame 13 supported at its forward end on the trailer support 12 and at its rear end on ground engaging wheels 14.

A generally rectangular dump box 15 is mounted on the frame 13 at the rear thereof on a transverse horizontal pivot 16 connecting the rear end of the box 15 to the rear end of the frame 13. The box 15 has a generally rectangular horizontal bottom wall 17 supporting a pair of spaced apart parallel side walls 18, 19 which extend upwardly therefrom. A front wall 20 connects the side walls 18, 19 and extends upwardly from the bottom wall 17. A tail gate 21 is hingedly connected to the upper rear ends of the side walls 18, 19 for hinging outwardly to the position illustrated in FIG. 4 when the box 15 is elevated to dumping position.

A telescoping hydraulic cylinder 22 is pivotally connected at one end to a bracket 23 mounted on the frame 13. The hydraulic cylinder 22 is pivotally connected at 23 to the bottom of the box 15. The hydraulic cylinder 22 is connected by suitable means (not shown) to a source of hydraulic fluid under pressure and a remote control located in the cab of the truck 11 so that when actuated the box 15 is raised at its forward end about the pivot 16 to a position as illustrated in FIG. 4 to dump the contents thereof.

A box 24 is carried by the frame 13 forwardly of the box 15 at the forward end of the frame 13. The box 24 includes a generally rectangular bottom wall 25 having an upwardly and rearwardly sloping extension 26 formed integrally therewith. A pair of side walls 27, 28 extend upwardly from the bottom wall 25 and its extension 26 in spaced apart parallel relation. A forward wall 29 connects the side walls 27, 28 and extends perpendicularly upwardly from the bottom wall 25. The side walls 27, 28 are spaced apart a distance less than the space between the side walls 18, 19 of the box 15 as can be seen in FIG. 1 for reasons to be assigned.

A pair of generally horizontal frame members 30, 31 are secured to the box 24 at the bottom portion thereof and extend rearwardly therefrom generally underlying the upwardly sloping extension 26 of the bottom wall 25. The frame members 30, 31 are arranged in spaced apart parallel relation and have their rear ends secured to brackets 32, 33 formed on opposite sides of the frame 13. Pivot pins 34, 35 secure the frame members 30, 31 to the brackets 32, 33 respectively.

A telescoping hydraulic cylinder 36 has one end secured to a bracket 37 on the frame 13 by means of a pivot pin 38. The opposite end of the hydraulic cylinder 36 is connected by a pivot pin 39 to the box 24. The hydraulic cylinder 36 is connected by suitable means (not shown) to a source of hydraulic fluid under pressure and to a remote control located in the cab of the truck 11 so that when actuated the hydraulic cylinder 36 will cause the box 24 to raise pivoting about the pivot 35.

The box 24 is somewhat taller than the box 15 so that the rear edge 40 of the extension 26 is substantially higher than the box 15. When the box 24 is pivoted to its highest position as illustrated in FIG. 5 the edge 40 of the extension 26 is forward of the front wall 20 of the box 15 and is spaced above the side walls 18, 19.

In the use and operation of the invention the trailer 10 has the box 15 and the box 24 filled in any conventional manner and is then transported to the dumping location. After the trailer 10 is properly positioned the box 15 is dumped by actuation of the hydraulic cylinder 22 and is then lowered back to the frame 13. The contents of the box 24 is then dumped into the box 15 by actuation of the hydraulic cylinder 36. The box 24 is then lowered to the frame 13 and the contents from the box 24 now in the box 15 are dumped from the box 15 by again actuating the hydraulic cylinder 22. Obviously the contents of the box 15 and the box 24 may be of a different catagory such as having sand in one box and gravel in the other and the contents of the two boxes may be dumped at separate locations when desired.

The state laws controlling the size and weight permitted to be hauled in trucks and trailers are not uniform, however, in many states the law requires that a trailer carrying the maximum payload permitted be quite long in length (in excess of 30 feet). In order to comply with the law and obtain the benefits of carrying the maximum payload prior art dumping trailers have used a long single box which is exceedingly unstable when raised to dumping position particularly if on unstable or sloping ground. Such long single boxes are adversely affected by wind and by material sticking in the front of the box during the dumping operation. Further the long single box requires a much more powerful hydraulic cylinder for lifting the much greater load and this hydraulic cylinder must also be extendable to a greater height, such as to permit the forward portion of the box to be raised a considerable distance above the frame of the trailer.

The use of the two boxes of the instant invention permits the carrying of the maximum payload allowed on a trailer having a length sufficient to comply with the law. The hydraulic mechanism for raising each of the boxes is of a power and lift height conventionally used with short box dumping. The height of the load above the trailer frame when dumping is substantially less than that for a single box trailer.

Having thus described the preferred embodiment of the invention it should be understood that numerous structural modifications and adaptations may be resorted to without departing from the spirit of the invention.

What is claimed is:

1. A dumping trailer comprising a generally horizontal frame supported at one end by ground engaging wheels and adapted for support at the opposite end by a tractor truck, a box, means mounting said box on the rear end of said frame for pivotal movement about a transverse axis to a dumping position, a second box, and means mounting said second box on said frame forwardly of said first box for pivotal movement about a transverse axis to a dumping position overlying said first box, said second box having a height substantially greater than the height of said first box and a width slightly less than the width of said first box whereby upon pivotal movement of said second box into position over said first box the contents of said second box will dump into said first box.

2. A device as claimed in claim 1 wherein the means mounting said first box includes a hydraulic cylinder for raising said first box to a dumping position.

3. A device as claimed in claim 2 wherein the means mounting said second box includes a hydraulic cylinder for raising said second box to a dumping position.

4. A device as claimed in claim 1 wherein said first box has a generally horizontal bottom wall, spaced apart parallel side walls, a transverse forward end wall connecting said side walls and extending upwardly from said bottom wall, and a tail gate pivotally mounted to the rear upper edges of said side walls.

5. A device as claimed in claim 1 wherein said second box has a generally rectangular generally horizontal bottom wall, an upwardly and rearwardly sloping extension integrally formed on said bottom wall, a pair of oppositely disposed parallel side walls extending upwardly from said bottom wall and said extension, and a front wall extending upwardly from said bottom wall connecting said side walls.

6. A device as claimed in claim 5 wherein said means mounting said second box includes a pair of frame members secured to said second box and extending generally horizontally rearwardly for connection to said frame.

* * * * *